United States Patent
He et al.

(10) Patent No.: US 10,580,176 B2
(45) Date of Patent: Mar. 3, 2020

(54) VISUALIZATION OF USER INTENT IN VIRTUAL AGENT INTERACTION

(71) Applicant: Microsoft Technology Licensing, LLC, Redmond, WA (US)

(72) Inventors: Pengcheng He, Beijing (CN); Weizhu Chen, Kirkland, WA (US); Robert S. Harrell, Redmond, WA (US); Liaoyuan Ning, Sammamish, WA (US); Jiaye Xie, Redmond, WA (US); Zheng Chen, Bellevue, WA (US); Mingyu Wang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 16/022,362

(22) Filed: Jun. 28, 2018

(65) Prior Publication Data

US 2020/0005503 A1  Jan. 2, 2020

(51) Int. Cl.
*G06T 11/20* (2006.01)
*G06N 3/08* (2006.01)
*G06F 17/27* (2006.01)
*G09B 3/00* (2006.01)
(Continued)

(52) U.S. Cl.
CPC ........ *G06T 11/206* (2013.01); *G06F 17/2785* (2013.01); *G06N 3/08* (2013.01);
(Continued)

(58) Field of Classification Search
CPC ... G06T 11/206; G06F 9/453; G10L 2015/088
See application file for complete search history.

(56) References Cited

U.S. PATENT DOCUMENTS 8,204,751 B1   6/2012  Di Fabbrizio et al.
2003/0014260 A1  1/2003  Coffman et al.
(Continued)

FOREIGN PATENT DOCUMENTS

WO    0209399 A2    1/2002

OTHER PUBLICATIONS

"International Search Report and Written Opinion Issued in PCT Application No. PCT/US19/038356", dated Aug. 21, 2019, 11 Pages.
(Continued)

*Primary Examiner* — Michelle L Sams
(74) *Attorney, Agent, or Firm* — Schwegman Lundberg & Woessner, P.A.

(57) ABSTRACT

Generally discussed herein are devices, systems, and methods for visualization of user intent in accessing a virtual agent. A method can include receiving sentences from the respective interaction sessions, projecting the sentences to a higher-dimensional space to create respective higher-dimensional vectors, projecting the higher-dimensional vectors to a lower-dimensional space to create respective lower-dimensional vectors, the lower-dimensional space including either two dimensions or three dimensions, plotting the lower-dimensional vectors as respective points on a graph, encoding the respective points consistent with the respective intents determined to be associated with the sentences by an intent classifier to create encoded points, and generating a visual representation of the encoded points.

20 Claims, 9 Drawing Sheets

(51) Int. Cl.
*G06F 9/451* (2018.01)
*G10L 15/08* (2006.01)

(52) U.S. Cl.
CPC ............... *G06F 9/453* (2018.02); *G09B 3/00* (2013.01); *G10L 2015/088* (2013.01)

(56) References Cited

U.S. PATENT DOCUMENTS

| | | | |
|---|---|---|---|
| 2012/0089394 | A1 | 4/2012 | Teodosiu et al. |
| 2015/0317302 | A1 | 11/2015 | Liu et al. |
| 2015/0370787 | A1 | 12/2015 | Akbacak et al. |
| 2017/0024912 | A1* | 1/2017 | de Castro Alves ..... G06F 16/26 |
| 2017/0032273 | A1* | 2/2017 | Ho ..................... G06F 17/2715 |
| 2018/0052885 | A1 | 2/2018 | Gaskill et al. |
| 2018/0082184 | A1 | 3/2018 | Guo et al. |

OTHER PUBLICATIONS

"International Search Report and Written Opinion Issued in PCT Application No. PCT/US19/038355", dated Jul. 25, 2019, 11 Pages.

Hashemi, et al., "Query Intent Detection using Convolutional Neural Networks", In International Conference on Web Search and Data Mining, Workshop on Query Understanding, Feb. 22, 2016, 5 Pages.

"International Search Report and Written Opinion Issued in PCT Application No. PCT/US2019/038358", dated Sep. 18, 2019, 14 Pages.

"International Search Report and Written Opinion Issued in PCT Application No. PCT/US2019/38530", dated Oct. 2, 2019, 11 Pages.

"International Search Report and Written Opinion Issued in PCT Application No. PCT/US2019/38542", dated Sep. 13, 2019, 11 Pages.

Ruotsalo, et al., "Interactive Intent Modeling: Information Discovery Beyond Search", In Journal of Communications of the ACM, vol. 58, Issue 1, Jan. 1, 2015, pp. 86-92.

Li, et al., "Personal Knowledge Graph Population from User Utterances in Conversational Understanding", In Proceedings of the IEEE Spoken Language Technology Workshop, Dec. 7, 2014, pp. 224-229.

* cited by examiner

VISUALIZATION OF USER INTENT IN VIRTUAL AGENT INTERACTION

RELATED APPLICATIONS

This application is related to U.S. patent application Ser. No. 16/022,317 titled "ARTIFICIAL INTELLIGENCE ASSISTED CONTENT AUTHORING FOR AUTOMATED AGENTS" and filed on Jun. 28, 2018, U.S. patent application Ser. No. 16/022,326 titled "KNOWLEDGE-DRIVEN DIALOG SUPPORT CONVERSATION SYSTEM" and filed on Jun. 28, 2018, U.S. patent application Ser. No. 16/022,336 titled "OFFTRACK VIRTUAL AGENT INTERACTION SESSION DETECTION" and filed on Jun. 28, 2018, and U.S. patent application Ser. No. 16/022,355 titled "CONTEXT-AWARE OPTION SELECTION IN VIRTUAL AGENT" and filed on Jun. 28, 2018.

BACKGROUND

Virtual agents are becoming more prevalent for a variety of purposes. A virtual agent may conduct a conversation with a user. The conversation with the user may have an intent, such as to provide a user with a solution to a problem they are experiencing. Current virtual agents fail to meet user expectations or solve the problem when they receive a response from the user that is unexpected. One reason for the failure may be that the virtual agent misunderstands the intent of the user. Another reason for the failure may be that the virtual agent cannot solve a problem associated with the intent. Yet another reason for the failure may be the user having multiple intents and changing focus from one intent to another intent during the conversation with the virtual agent.

Conventional virtual agents are not equipped to handle intent changes or intent misunderstanding. Typically, the virtual agent continues along a predefined question and answer path and simply repeats the previous question in response to a user changing their intent, making another intent known, or providing another unexpected response. These virtual agents are very linear in their approach to problem solving and do not allow variation from the linear "if then" structures that scope the problem and solutions. This leads to user frustration with the virtual agent or a brand or company associated with the virtual agent, or lack of resolution to the problem.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

A computing device can include a processor, and a memory device including instructions embodied thereon, wherein the instructions, which when executed by the processor, cause the processor to perform operations for visualization of respective intents of first users in respective interaction sessions with at least one virtual agent, the operations comprising receiving sentences from the respective interaction sessions, projecting the sentences to a higher-dimensional space to create respective higher-dimensional vectors, projecting the higher-dimensional vectors to a lower-dimensional space to create respective lower-dimensional vectors, the lower-dimensional space including either two dimensions or three dimensions, plotting the lower-dimensional vectors as respective points on a graph, encoding the respective points consistent with the respective intents determined to be associated with the sentences by an intent classifier to create encoded points, and generating a visual representation of the encoded points.

A non-transitory machine-readable storage medium, the machine-readable storage medium including instructions that, when executed by a processor and memory of a machine, causes the machine to perform operations for visualization of a user intent in an interaction with a virtual agent, the operations can include receiving sentences from the respective interaction sessions, projecting the sentences to a higher-dimensional space to create respective higher-dimensional vectors, projecting the higher-dimensional vectors to a lower-dimensional space to create respective lower-dimensional vectors, the lower-dimensional space including either two dimensions or three dimensions, plotting the lower-dimensional vectors as respective points on a graph, encoding the respective points consistent with the respective intents determined to be associated with the sentences by an intent classifier to create encoded points, and generating a visual representation of the encoded points.

A method for visualization of a user intent in an interaction with a virtual agent, the method comprising a plurality of operations executed with a processor and memory of a computing device, the plurality of operations can include receiving sentences from the respective interaction sessions, projecting the sentences to a higher-dimensional space to create respective higher-dimensional vectors, projecting the higher-dimensional vectors to a lower-dimensional space to create respective lower-dimensional vectors, the lower-dimensional space including either two dimensions or three dimensions, plotting the lower-dimensional vectors as respective points on a graph, encoding the respective points consistent with the respective intents determined to be associated with the sentences by an intent classifier to create encoded points, and generating a visual representation of the encoded points.

DETAILED DESCRIPTION

Figure 1:
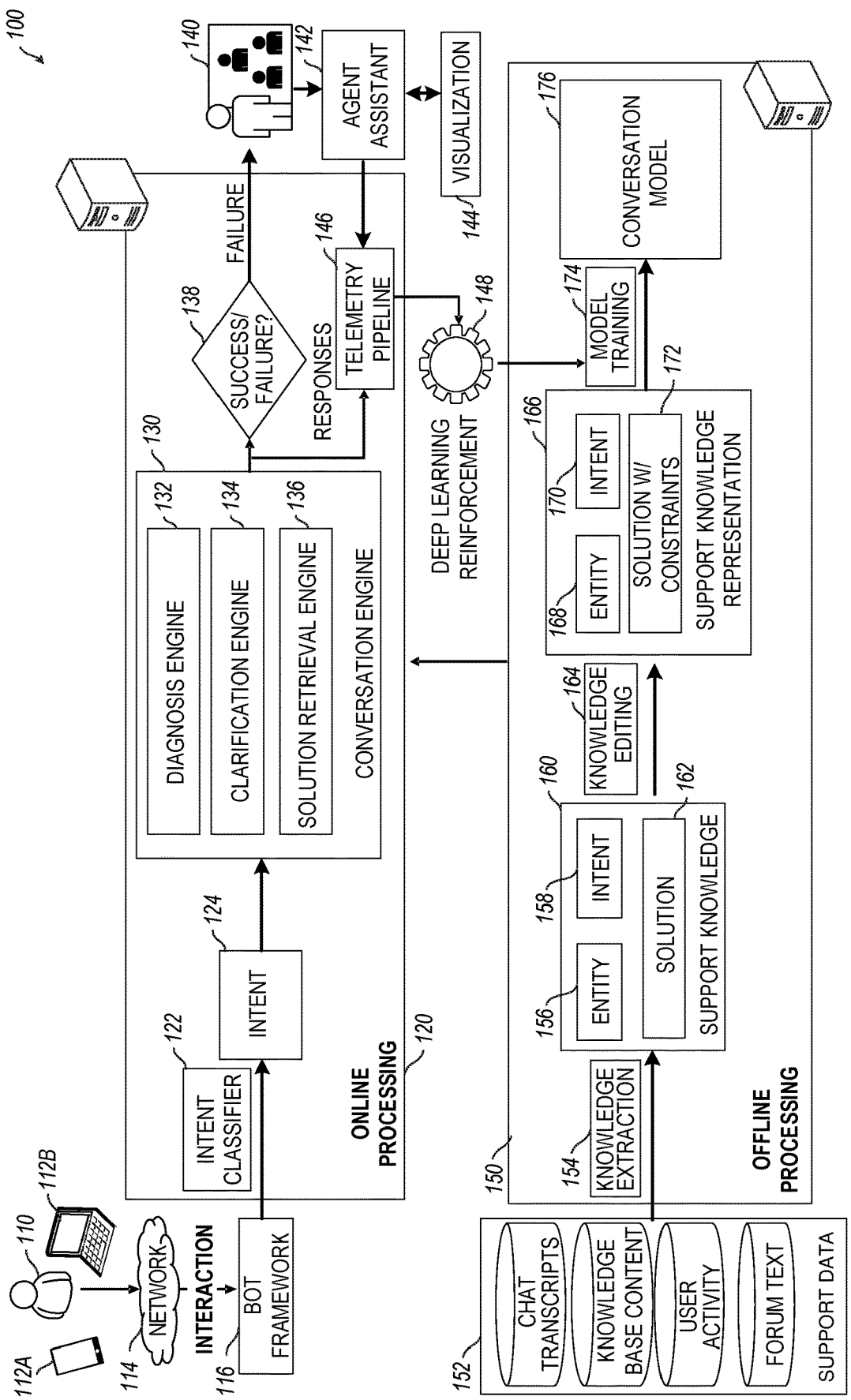
FIG. 1 is a diagram illustrating an example system architecture 100 for enhanced conversation capabilities in a virtual agent.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

Current virtual agent systems suffer from intent management problems. An intent, as used herein, represents a reason that a user accesses the virtual agent, such as to solve a problem experienced by the user. Intents are typically manually identified and defined. Typically, a system is then implemented to detect to which intent of the manually defined intents that a particular phrase from a user corresponds. In these typical systems, it is difficult to discern whether users are having problems beyond those manually defined intents and what those problems are. Another problem with these typical systems is the difficulty in discerning whether a sentence is associated with a correct intent. Typically, it is assumed that an intent classifier is correct and errors are only found by laborious human review or by happenstance.

Embodiments herein disclose enhanced intent visualization techniques that help identify and define new intents, identify intents that are no longer a concern for users, identify sentences that are associated with an incorrect intent, or overcome other problems with managing intents in previous virtual agent systems. A sentence can be convert to a vector in a human-visible space (up to three dimensions). The conversion may be carried out in a manner in which sentences that are more semantically similar correspond to vectors that are closer in the space than sentences that are less semantically similar. The vectors can be represented by a shape that is encoded (e.g., by color, pattern, size, a combination thereof, or the like) to indicate which intent is associated with the corresponding sentence. A user can then easily discern outliers and determine whether the outliers are correct or incorrect and make appropriate changes. Without these projections to a lower-dimensional space, it is generally hard for a user to edit an intent, find an incorrect intent, or manage the intents. With such projections a user can find the overlap between intents or understand the distance between intents in the semantic space.

An intent is everchanging, as a product/service is evolving. It is very difficult to capture or predict these intent changes. An innovation of embodiments makes it easy to identify the difference between an existing intent and intent of user traffic after the intent is defined, such as to help highlight their difference.

In some embodiments, a virtual agent system may record incoming sentences from users and label the sentences with timestamps and a corresponding intent. Data analytics may then be performed and displayed for the user. The data analytics may provide a view of statistics that indicates to the user whether a new intent should be defined or an old intent no longer needs to be detected. The intent classifier may then be trained to detect the new intent or to no longer detect the old intent. These intent visualization systems and methods thus provide a technical solution to the problem of intent management in virtual agents.

FIG. 1 is a diagram illustrating an example system architecture 100 for enhanced conversation capabilities in a virtual agent. The present techniques for intent visualization or management may be employed at a number of different locations in the system architecture 100, including, intent classifier 122, intent 124, visualization 144, and other aspects of data used in offline processing system 150 or online processing system 120, as discussed in the following paragraphs.

The system architecture 100 illustrates an example scenario in which a human user 110 conducts an interaction with a virtual agent online processing system 120. The human user 110 may directly or indirectly conduct the interaction via an electronic input/output device, such as within an interface device provided by a mobile device 112A or a personal computing device 112B. The human-to-agent interaction may include an exchange of one or more of text (e.g., a chat session), graphics (e.g., a video conference), or audio (e.g., a voice conversation). Other forms of electronic devices (e.g., smart speakers, wearables, etc.) may provide an interface for the human-to-agent interaction or related content. The interaction that is captured and output via the device(s) 112A, 112B, may be communicated to a bot framework 116 via a network. For instance, the bot framework 116 may provide a standardized interface in which a conversation may be carried out between the virtual agent and the human user 110 (such as in a textual chat bot interface).

The conversation input and output are provided to and from the virtual agent online processing system 120, and conversation content is parsed and output with the system 120 using a conversation engine 130. The conversation engine 130 may include components that assist in identifying, extracting, outputting, and directing the human-agent conversation and related conversation content. As depicted, the conversation engine 130 includes: a diagnosis engine 132 used to assist with the output and selection of a diagnosis (e.g., a problem identification); a clarification engine 134 used to obtain additional information from incomplete, ambiguous, or unclear user conversation inputs or to determine how to respond to a human user after receiving an unexpected response from the human user; and a solution retrieval engine 136 used to select and output a particular solution or sets of solutions, as part of a technical support conversation. Thus, in the operation of a typical human-agent interaction via a chatbot, various human-agent text or other media may be exchanged between the bot framework 116 and the conversation engine 130.

The virtual agent online processing system 120 involves the use of intent processing, as conversational input received via the bot framework 116 is classified into an intent 124 using an intent classifier 122. As discussed herein, an intent refers to a specific type of issue, task, or problem to be resolved in a conversation, such as an intent to resolve an account sign-in problem, an intent to reset a password, an intent to cancel a subscription, an intent to update software, an intent to fix a bug in software, an intent to pair devices, or the like. For instance, as part of the human-agent interaction in a chatbot, text captured by the bot framework 116 may be provided to the intent classifier 122. The intent classifier 122 identifies at least one intent 124 to guide the conversation and the operations of the conversation engine 130. The intent 124 may be used to identify the dialog script that defines the conversation flow that attempts to address the identified intent. The conversation engine 130 provides responses and other content according to a knowledge set used in a conversation model, such as a conversation model 176 that can be developed using an offline processing technique discussed below.

The virtual agent online processing system 120 may be integrated with feedback and assistance mechanisms, to address unexpected scenarios and to improve the function of the virtual agent for subsequent operations. For instance, if the conversation engine 130 is not able to guide the human user 110 to a particular solution, an evaluation 138 may be performed to escalate the interaction session to a team of human agents 140 who can provide human agent assistance 142. The human agent assistance 142 may be integrated with aspects of visualization 144, such as to identify conversation workflow issues or understand how an intent is linked to a large or small number of proposed solutions. In other examples, such visualization may be used as part of offline processing and training. Further details on the visualization 144, intent classifier 122, intent 124, and the management of intents and their relations to solutions or conversations are provided regarding FIGS. 3-8.

The conversation model employed by the conversation engine 130 may be developed through use of a virtual agent offline processing system 150. The conversation model 176 may include any number of questions, answers, or constraints, as part of generating conversation data. Specifically, FIG. 1 illustrates the generation of a conversation model 176 as part of a support conversation knowledge scenario, where a human-virtual agent conversation is used for satisfying an intent with a customer support purpose. The purpose may include a technical issue assistance, requesting an action be performed, or other inquiry or command for assistance.

The virtual agent offline processing system 150 may generate the conversation model 176 from a variety of support data 152, such as chat transcripts, knowledge base content, user activity, web page text (e.g., from web page forums), and other forms of unstructured content. This support data 152 is provided to a knowledge extraction engine 154, which produces a candidate support knowledge set 160. The candidate support knowledge set 160 links each candidate solution 162 with at least one entity 156 and at least one intent 158.

As an example, an entity may be a keyword or other tracked value that impacts the flow of the conversation. For example, if an end user intent is, "printer is not working", a virtual agent may ask for a printer model and operating system to receive example replies such as "S7135" and "Windows". In this scenario, "printer", "S7135" and "Windows" are entities. As an example, an intent may represent the categorization of users' questions, issues, or things to do. For example, an intent may be in the form of, "Windows 10 upgrade issue", "How do I update my credit card?", or the like. As an example, a solution may include or define a concrete description to answer or solve a users' question or issue. For example, "To upgrade to Windows 10, please follow the following steps: 1) backup your data, . . . 2) Download the installer, . . . , 3) Provide installation information, . . . ", etc. Although the present examples are provided with reference to support data in a customer service context, it will be understood that the conversation model 176 may be produced from other types of input data and other types of data sources and may be used in other contexts, such as chit-chat or other virtual agents.

The candidate support knowledge set 160 is further processed as part of a knowledge editing process 164, which may be used to produce a support knowledge representation data set 166. The support knowledge representation data set 166 also links each identified solution 172 with an entity 168 and an intent 170, and defines the identified solution 172 with constraints. For example, a human editor may define constraints, such as conditions or requirements for the applicability of a particular intent or solution. Such constraints may also be developed as part of automated, computer-assisted, or human-controlled techniques in the offline processing (such as with the model training 174 or the knowledge editing process 164).

Based on the candidate support knowledge set 160, aspects of model training 174 may be used to generate the resulting conversation model 176. This conversation model 176 may be deployed in the conversation engine 130, for example, and used in the online processing system 120. The various responses received in the conversation of the online processing may also be used as part of a telemetry pipeline 146, which provides a deep learning reinforcement 148 of the responses and response outcomes in the conversation model 176. Accordingly, in addition to the offline training, the reinforcement 148 may provide an online-responsive training mechanism for further updating and improvement of the conversation model 176.

Figure 2:
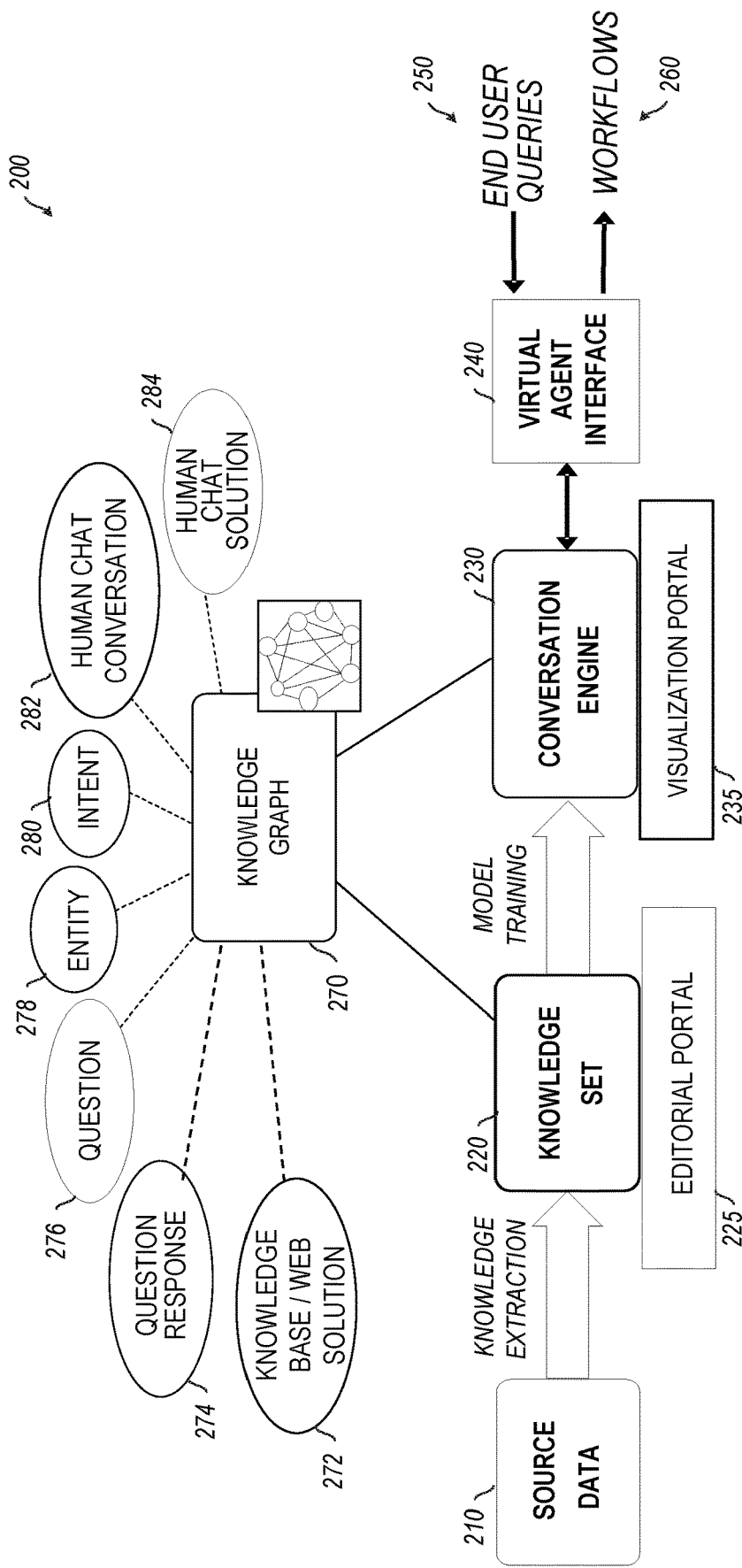
FIG. 2 is an operational flow diagram illustrating an example deployment of a knowledge set used in a virtual agent, such as with use of the conversation model and online/offline processing depicted in FIG. 1.

FIG. 2 is an operational flow diagram illustrating an example deployment 200 of a knowledge set used in a virtual agent, such as with use of the conversation model 176 and online/offline processing depicted in FIG. 1. The operational deployment 200 depicts an operational sequence of source data 210, knowledge set 220, conversation engine 230, virtual agent interface 240, end user query 250, and control workflows 260 involving the creation and use of organized knowledge, and a data organization sequence of knowledge graph 270, knowledge content data 272, question response data 274, question data 276, entity data 278, intent data 280, human chat conversation data 282, and human chat solution data 284, involving the creation of a data structure, termed as a knowledge graph 270, which is used to organize concepts.

In an example, source data 210 is unstructured data from a variety of sources (such as the previously described support data). A knowledge extraction process is operated on the source data 210 to produce an organized knowledge set 220. An editorial portal 225 may be used to allow the editing, selection, activation, or removal of particular knowledge data items by an editor, administrator, or other personnel. The data in the knowledge set 220 for a variety of associated issues or topics (sometimes called intents), such as support topics, is organized into a knowledge graph 270 as discussed below.

The knowledge set 220 is applied with model training, to enable a conversation engine 230 to operate with the conversation model 176 (see FIG. 1). The conversation engine 230 selects appropriate inquiries, responses, and replies for the conversation with the human user, as the conversation engine 230 uses information on various topics stored in the knowledge graph 270. A visualization engine 235 may be used to allow visualization of conversations, inputs, outcomes, intents, and other aspects of use of the conversation engine 230.

The virtual agent interface 240 is used to operate the conversation model in a human-agent input-output setting (sometimes called an interaction session). While the virtual agent interface 240 may be designed to perform a number of interaction outputs beyond targeted conversation model questions, the virtual agent interface 240 may specifically use the conversation engine 230 to receive and respond to an end user query 250 or statement. The virtual agent interface 240 then may dynamically enact or control workflows 260 which are used to guide and control the conversation content and characteristics.

The knowledge graph 270 is shown as including linking to a number of data properties and attributes, relating to applicable content used in the conversation model 176. Such linking may involve relationships maintained among: knowledge content data 272, such as embodied by data from a knowledge base or web solution source; question response data 274, such as natural language responses to human questions; question data 276, such as embodied by natural language inquiries to a human; entity data 278, such as embodied by properties which tie specific actions or information to specific concepts in a conversation; intent data 280, such as embodied by properties which indicate a particular problem or issue or subject of the conversation; human chat conversation data 282, such as embodied by rules and properties which control how a conversation is performed; and human chat solution data 284, such as embodied by rules and properties which control how a solution is offered and provided in a conversation.

Figure 3:
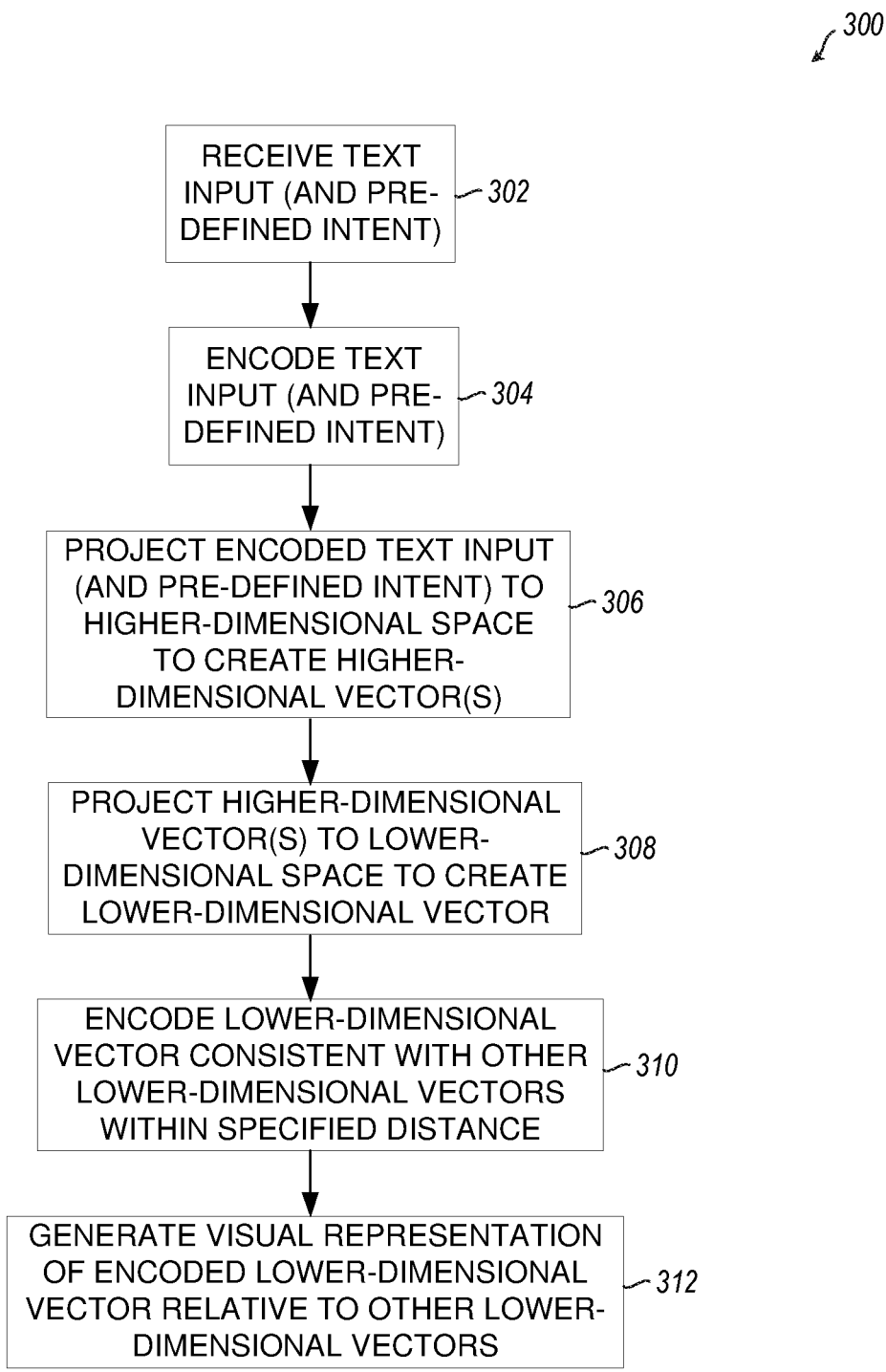
FIG. 3 illustrates, by way of example, a diagram of an embodiment of a method of intent visualization.

FIG. 3 illustrates, by way of example, a diagram of an embodiment of a method 300 of intent visualization. As previously discussed, an intent is a purpose for which the user accesses the virtual agent. The intent can be defined on a product or service level, a version or edition of a product or service level, or a specific problem level. For example, an intent can include "OPERATING SYSTEM INSTALL", "APPLICATION LOGIN", "TABLET VERSION 9 HARDWARE FAILURE", or the like. The method 300 as illustrated includes receiving text input and a pre-defined intent, at operation 302; encoding the text input, at operation 304; projecting encoded text input to higher-dimensional space to create a higher-dimensional vector, at operation 306; projecting the higher-dimensional vector to a lower-dimensional (e.g., up to three-dimensional (3D)) space to create a lower-dimensional vector, at operation 308; encoding the lower-dimensional vector consistent with an intent associated with the text, at operation 310; and generating a visual representation of the encoded lower-dimensional vector relative to other lower-dimensional vectors. The intent associated with text may be determined by the intent classifier 122. The operations of the method 300 may be performed by the visualization 144, agent assistance 142, a processor 1002 (see FIG. 10) or other processing circuitry.

The text input received at operation 302 can be from the user 110 via the user device 112A or 112B. Operations 304 and 306 may include using the structure of FIG. 4 to encode and generate a higher-dimensional vector, respectively.

Figure 4:
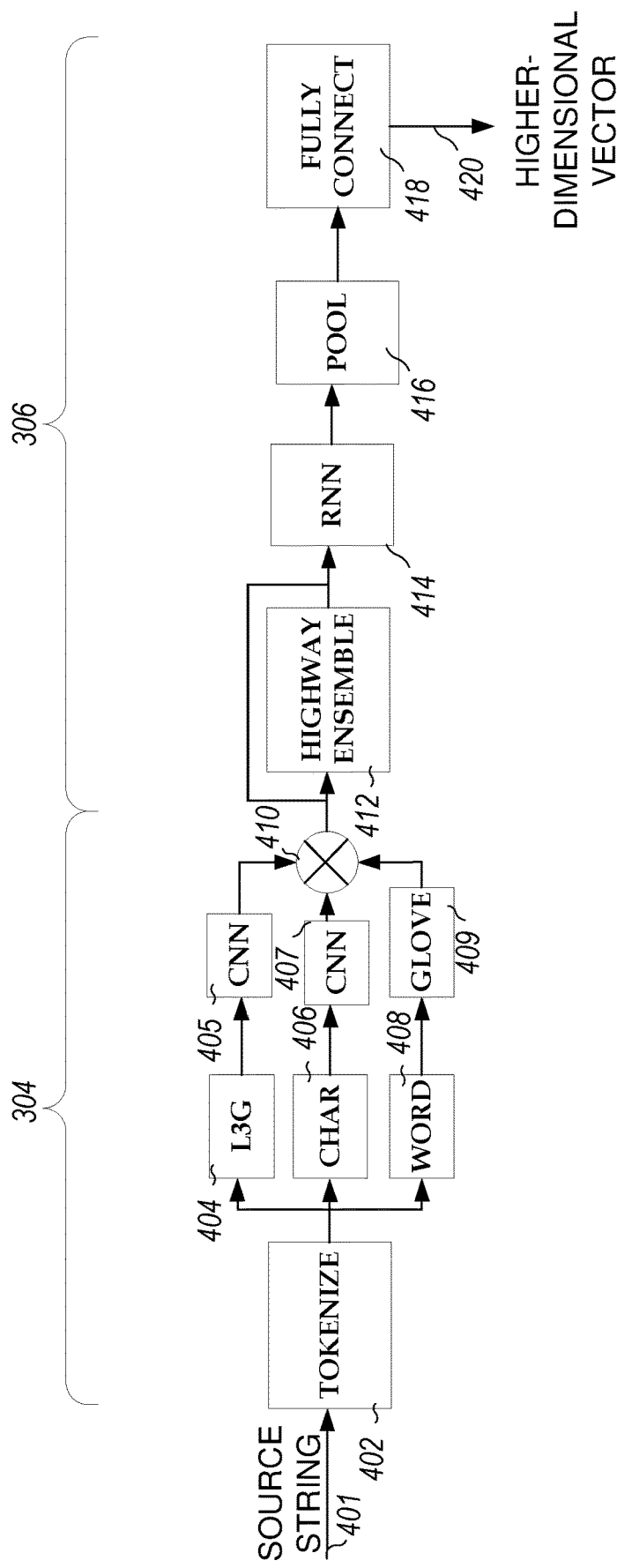
FIG. 4 illustrates, by way of example, a block flow diagram of an embodiment of a few of the operations of FIG. 3.

FIG. 4 illustrates, by way of example, a block flow diagram of an embodiment of the operations 304 and 306. The operations 304 and 306 as illustrated include a structure configured to perform operations on an input string, namely a source string 401. Processing circuitry may be configured to perform the operations 304 and 306.

The source string 401 includes input from the user, such as can be received at operation 302. The source string 401 may include a sentence or phrase provided from a human user to the bot framework 116. A goal of the method 300 may be to provide a view of the source string 401 and an associated intent relative to other source strings and associated intents. A goal of the operations 302 and 304 can be to translate text to a view of a vector in a human-understandable space. The human-understandable space may be one in which vectors associated with respective text that is more semantically similar (as opposed to syntactically similar) to each other are closer (e.g., by Euclidean distance or other distance metric) than vectors associated with respective text that is less semantically similar. Each source string 401 may be evidence of an intent of the user. The intent can be defined at one of a variety of granularities. For example, an intent can be defined at a product level, version level, problem level, service level, or a combination thereof, as previously discussed. The source string 401 can include a word, phrase, sentence, character, a combination thereof or the like.

A tokenizer 402 receives the source string 401, demarcates separate tokens (individual words, numbers, symbols, etc.) in the source string 401, and provides the demarcated string. The demarcated string can be provided to each of a plurality of post processing units for post processing operations. The post processing units as illustrated include a tri-letter gram processor 404, a character processor 406, and a word processor 408. The tri-letter gram processor 604A breaks a word into smaller parts. The tri-letter gram processor 404 produces all consecutive three-character combinations in the received source string 401. For example, a tri-letter gram output for the input of "windows" can include "# wi, win, ind, ndo, dow, ows, ws #". The output of the tri-letter gram processor 404 is provided to a convolutional neural network 405 that outputs a vector of fixed length.

The character processor 406 produces a character embedding of the source string 401. The word processor 408 produces a word embedding of the source string 401. A character embedding and a word embedding are similar, but a character embedding n-gram can be shared across words. Thus, a character embedding can generate an embedding for an out-of-vocabulary word. A word embedding treats words atomically and does not share n-grams across words. For example, consider the phrase "game login". The word embedding can include "# ga, gam, game, ame, me #" and "# lo, log, logi, login, ogi, ogin, gin, in #". The character embedding can include "# ga, gam, game, game, game 1, ame, ame, ame 1, ame lo, . . . , login, ogi, ogin, gin, in #".

The embedding across words in a character embedding can help with embeddings for words that occur infrequently.

The character embedding from the character processor 406 can be provided to a CNN 407. The CNN 407 can receive the character embedding and produce a vector of fixed length. The CNN 407 can be configured (e.g., with weights, layers, number of neurons in a layer, or the like) the same or different as the CNN 405. The word embedding from the word processor 408 can be provided to a global vector processor 409. The global vector processor 409 can implement an unsupervised learning operation to generate a vector representation for one or more words provided thereto. Training can be performed on aggregated global word-to-word co-occurrence statistics from a corpus.

The vectors from the CNN 405, CNN 407, and the global vector processor 409 can be combined by the vector processor 410. The vector processor 410 can perform a dot product, multiplication, cross-correlation, average, or other operation to combine the vectors into a single, combined vector.

A function of the embeddings, such as from the CNN 405, CNN 407, and the global vector (glove) processor 409 can be to capture the semantic relation/similarity between any two strings. This similarity generally is not captured from the term or text itself. For example, "Costco retail" is not syntactically similar to "Amazon sales", but they are semantically similar they are related to each other, because from a history of context data, it can be seen that Costco and Amazon appear in similar contexts.

The combined vector can be provided to a highway ensemble processor 412 that combines the embeddings and retains the semantic relation. The illustrated embodiment includes multiple ways of generating an embedding, such as the character-wise with (1) the character embedding 406 and a CNN 407 and (2) the tri-letter gram processor 404 and the CNN 405, and a word-wise with the word embedding 408 and the glove processor 409. The highway ensemble processor 412 combines these embeddings. The highway ensemble processor 412 is an effective approach to ensemble/merge the two or more embeddings.

Figure 5:
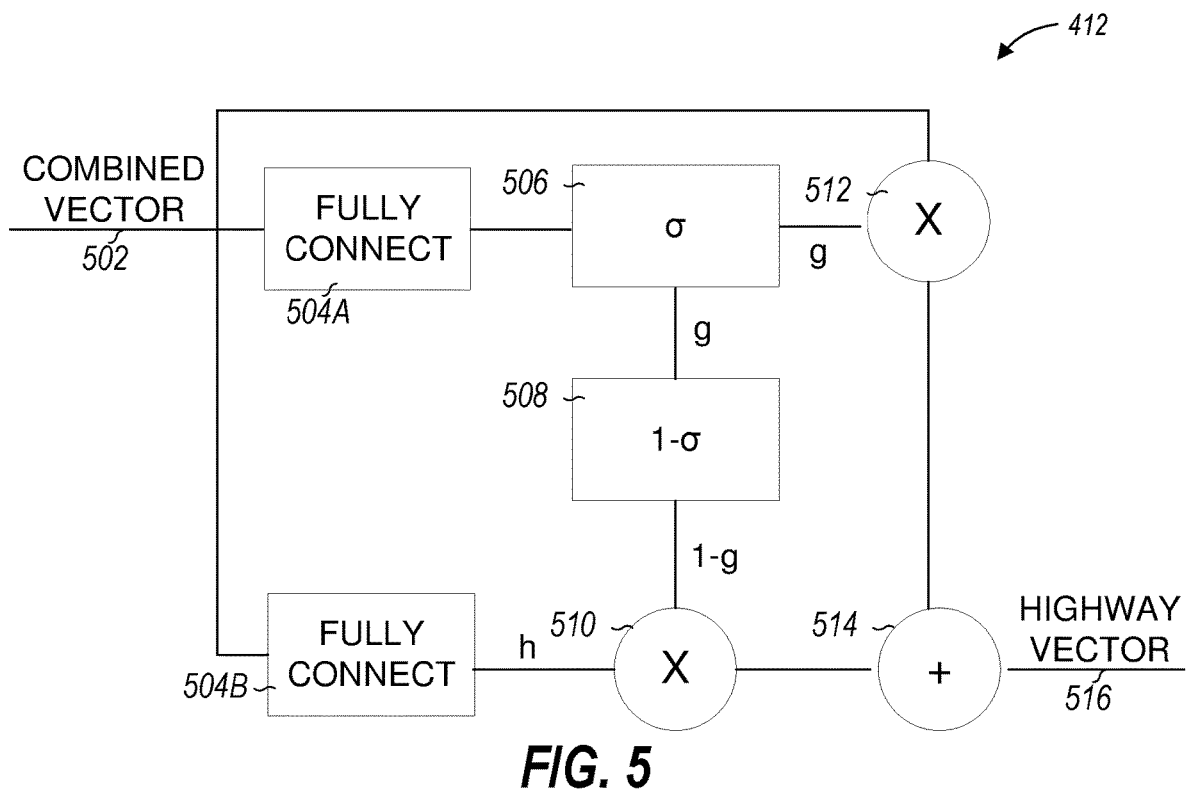
FIG. 5 illustrates, by way of example, a block flow diagram of an embodiment of the highway ensemble processor.

FIG. 5 illustrates, by way of example, a block flow diagram of an embodiment of the highway ensemble processor 412. A combined vector 502 can be received from the vector processor 410. The combined vector 502 can be input into two parallel fully connected layers 504 and 504 and provided to a multiplier 512. Neurons in a fully connected layer 504A-504B include connections to all activations in a previous layer. The fully connected layer 504B implements a transfer function, h, on the combined vector 502. The remaining operators, including a sigma processor 506, an inverse sigma operator 508, multiplier 510, multiplier 512, and adder 514 operate to produce a highway vector 516 in accord with the following Equations 1, 2, and 3:

$$g=\sigma(W_g \cdot x + b_g) \qquad \text{Equation 1}$$

$$h=\tanh(W_h \cdot x + b_h) \qquad \text{Equation 2}$$

$$y=h*(1-g)+x*g \qquad \text{Equation 3}$$

Where $W_g$ and $W_h$ are weight vectors, x is the input, y is the output, h is the transfer function, a is a configurable parameter, and g is derived from a.

The highway vector 516 from the highway ensemble processor 412 can be feedback as input to a next iteration of the operation of the highway ensemble processor 412. The highway vector 516 can be provided to a recurrent neural network (RNN) 414.

Figure 6:
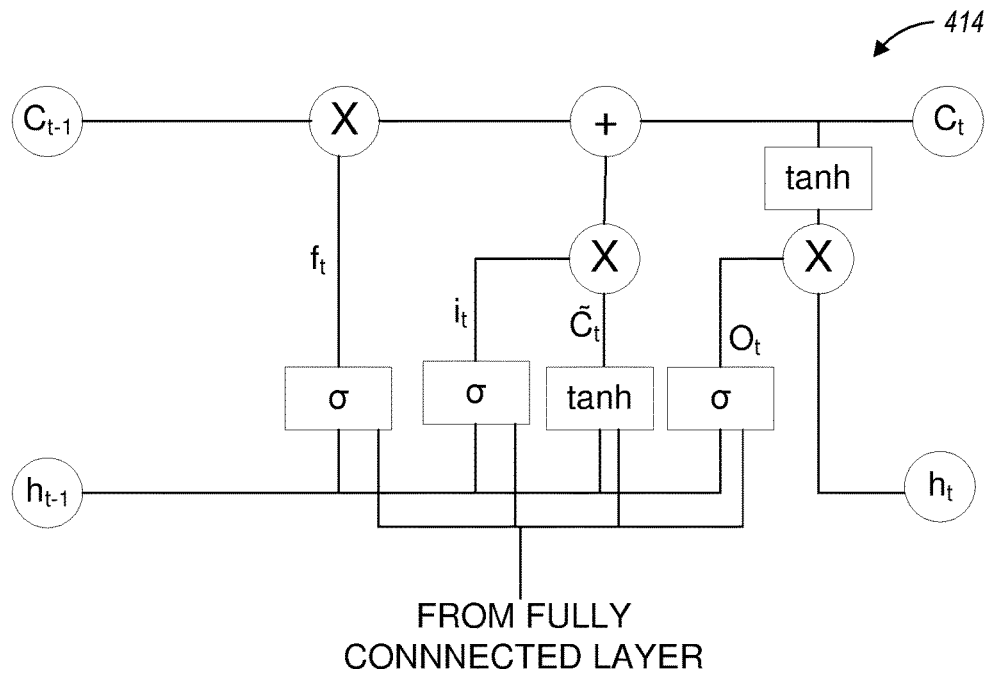
FIG. 6 illustrates, by way of example, a block flow diagram of an embodiment of the RNN.

FIG. 6 illustrates, by way of example, a block flow diagram of an embodiment of the RNN 414. The blocks of the RNN 414 perform operations based on a previous transfer function, previous output, and a current input in accord with Equations 4, 5, 6, 7, 8, and 9:

$$f_t=\sigma(W_f \cdot [h_{t-1}, x_t]+b_f) \qquad \text{Equation 4}$$

$$i_t=\sigma(W_i \cdot [h_{t-1}, x_t]+b_i) \qquad \text{Equation 5}$$

$$\tilde{C}_t=\tanh(W_C \cdot [h_{t-1}, x_t]+b_C) \qquad \text{Equation 6}$$

$$C_t=f_t*C_{t-1}+i_t*\tilde{C}_t \qquad \text{Equation 7}$$

$$o_t=\sigma(W_o \cdot [h_{t-1}, x_t]+b_o) \qquad \text{Equation 8}$$

$$h_t=o_t*\tanh(C_t) \qquad \text{Equation 9}$$

The output of the RNN 414 may be provided to a pooling processor 416. The pooling processor 416 combines outputs of a plurality of neurons from a previous layer into a single neuron. Max pooling, which uses a maximum value of all the plurality of neurons, and average pooling, which uses an average value of all the plurality of neurons, are examples of operations that may be performed by the pooling processor 416. The pooled vector can be provided to a fully connected layer 418, such as is similar to the fully connected layer 504A-504B.

The output of the fully connected layer 418 is a higher-dimensional vector 420 (e.g., 64-dimensions, 128-dimensions, 256-dimensions, more dimensions, or some number of dimensions therebetween). The higher-dimensional vector is to be understood relative to the lower-dimensional vector, such that the lower-dimensional vector includes fewer dimensions than the higher-dimensional vector. The space in which the higher-dimensional vector 420 resides is one in which items that are more semantic similar are closer to each other than items with less semantic similarity. Semantic similarity is different from syntactic similarity. Semantic similarity regards the meaning of a string, while syntactic similarity regards the content of the string. For example, consider the strings "Yew", "Yep", and "Yes". "Yes", "Yep", and "Yew" are syntactically similar in that they only vary by a single letter. However, "Yes" and "Yep" are semantically very different from "Yew". Thus, the higher-dimension vector representing "Yew" will be located further from the higher-dimension vector representing "Yes" than the higher-dimension vector representing "Yep" with high probability.

The operation 308 can include projecting the higher-dimensional vector 420 to a lower-dimensional space. The lower-dimensional space is chosen for visual simplicity and human understandability. In some embodiments a 3D space, two-dimensional (2D) space, or one-dimensional (1D) space may be chosen, as it is also human-understandable. However, graphic rendering and navigation of the rendering in 3D space may consume more compute resources than in 2D space. Embodiments can include graphic rendering and navigation in 1D, 2D, or 3D space. The operation 308 may include performing principal component analysis (PCA), kernel-PCA, t-distributed stochastic neighbor embedding (t-SNE), or parametric SNE, among other dimension-reduction techniques.

PCA includes an orthogonal transformation to convert a set of observations of possibly correlated variables into a set of values of linearly uncorrelated variables called principal components. If there are n observations with p variables, then the number of distinct principal components is min (n−1, p). This PCA transformation includes a first principal component that accounts for as much of the variability in the data as possible, and each succeeding component in turn has the highest variance possible under the constraint that it is orthogonal to the preceding components. kernel PCA is PCA performed in a reproducing kernel Hilbert space associated with a positive definite kernel.

t-SNE is a machine learning technique for visualization. t-SNE is a nonlinear dimensionality reduction technique well-suited for embedding high-dimensional data for visualization in a low-dimensional space of two or three dimensions. t-SNE models each high-dimensional object by a two- or three-dimensional point in such a way that similar objects are modeled by nearby points and dissimilar objects are modeled by distant points with high probability.

The t-SNE technique comprises two main stages: (1) construct a probability distribution over pairs of high-dimensional objects in such a way that similar objects have a high probability of being picked, while dissimilar points have a small probability of being picked; (2) define a similar probability distribution over the points in the low-dimensional map, and minimize a Kullback-Leibler divergence between the two distributions with respect to the locations of the points in the map. A Euclidean distance or other distance metric may be used as the base of a t-SNE similarity metric. Parametric t-SNE is a variation on t-SNE that performs the dimensionality reduction in multiple steps.

Another technique of dimensionality reduction includes autoencoding. An autoencoder is a type of neural network used to learn data encodings in an unsupervised manner. An autoencoder can learn a representation (encoding) for a set of data in which the encoding includes a dimensionality reduction. An autoencoder is often trained using one of the many variants of backpropagation, such as conjugate gradient method, steepest descent, or the like.

The operation 310 can include associating a shape that is colored, patterned, or a combination thereof with the point corresponding to the lower-dimensional vector. The operation 312 can include providing, on a display, a view of the shape and shapes corresponding to other source strings consistent with the values of the two-dimensional vector.

Figure 7:
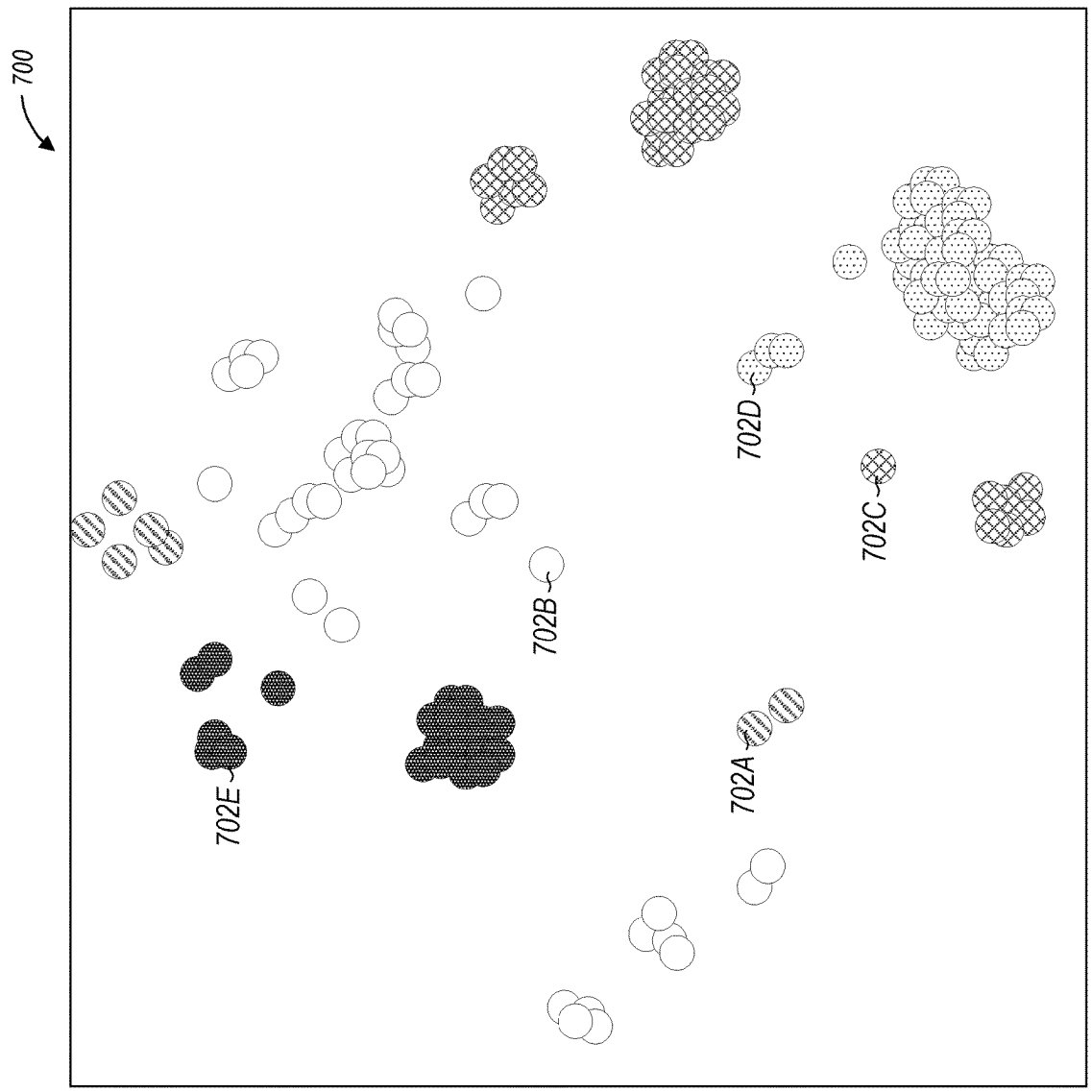
FIG. 7 illustrates, by way of example, a diagram of an embodiment of a graphical view of source strings modified in accord with the method and rendered on a display.

FIG. 7 illustrates, by way of example, a diagram of an embodiment of a graphical view of source strings modified in accord with the method 300 and rendered on a display 700. The view provided on the display 700 is of the points projected to 2D space, but 3D and 1D space views are also possible. The display 700 includes a view of the 2D vectors represented as patterned circles 702A, 702B, 702C, 702D, and 702E. Not all circles include reference numbers, to not obscure the view on the display 700. Only one circle 702A-702E of each pattern includes a reference number. Each pattern represents a different intent, such that each circle with the same pattern is associated with a same intent. Thus, a plurality of different source strings, for example 401A, 401E, 401L, and 401N can each be associated with a same intent, the intent corresponding with the circle 702B in the example of FIG. 7.

As can be seen, semantic similarity between source strings 401A-401P does not necessarily mean that the source strings 401A-401P are associated with a same intent. To help ensure that the intent (associated pattern or color) is correct, a human in the review workflow (e.g., 140) can be used to edit the intent or the intent classifier 122 can be used to determine the pattern or color. The intent classifier 122 can be implemented using a neural network trained on vetted input-output examples of input strings and corresponding output intents.

For each circle 702A-702E there is a corresponding source string 401A-401P. In response to selecting a source string 401A-401P, a corresponding circle 702A-702E can be highlighted or otherwise change color, shape, or size to draw the user's attention to the corresponding circle, or vice versa. In this manner, a human reviewer can easily verify whether an intent associated with the source string 401A-401P is correct. The human reviewer can edit an intent associated with the circle by selecting the circle and manually changing the intent through the display 700. Any changes made by the human reviewer can be recorded and used for future training of the intent classifier 122.

Figure 8:
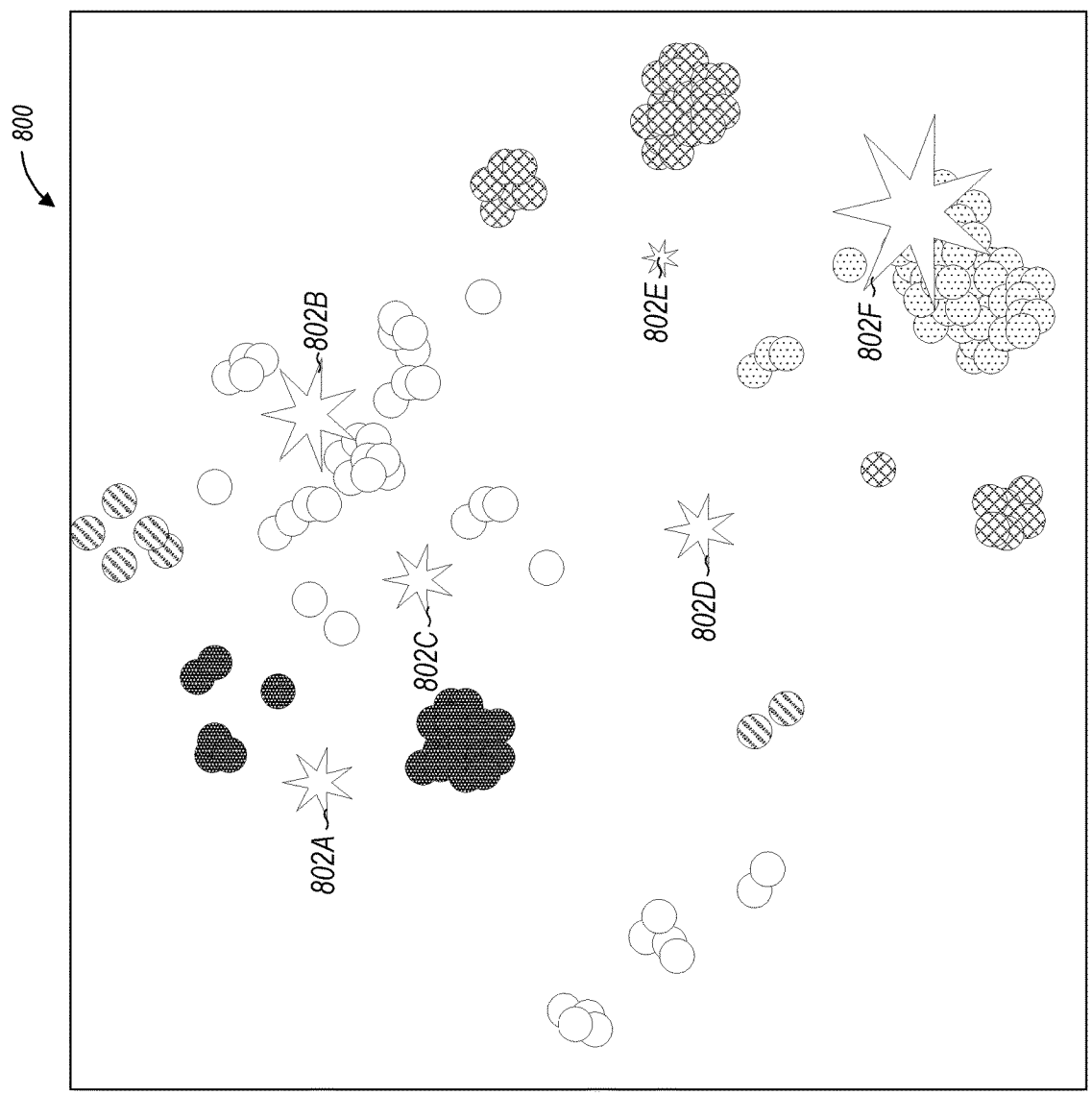
FIG. 8 illustrates, by way of example, a diagram of an embodiment of a display that includes the display after a user selects the control.

The display 700 can include a software control 704 that, when selected, causes centroids of trending topics to be shown on the display 700. FIG. 8 illustrates, by way of example, a diagram of an embodiment of a display 800 that includes the display 700 after a user selects the control 704. Selecting the control 704 can cause pre-determined online statistics to be displayed or can cause a query to be issued to the support data 152 or other database. The query can return centroids of topics (e.g., intents) that are used as source strings 401 and input into the method 300. The 2D vectors representing the centroids can be displayed on the display. The centroids are represented by the star shapes 802A, 802B, 802C, 802D, 802E, and 802F. The size of the shapes 802A-802F vary based on the number of times the topic associated with the centroid has been detected in specified period of time (e.g., minute, hour, day, month, year, etc. or some period of time therebetween).

In some embodiments, the shapes 802A-802F can be patterned, such as in a manner similar to a group of circles 702A-702E of which the shape 802A-802F represents the centroid. Note that, in the embodiment shown in FIG. 8, there are six centroids and six corresponding topics 804A-804F, while there are only five intents (only five different patterns of circles). This suggests that the virtual agent may not be able to handle problems associated with one of the topics, at least because it does not understand an intent associated with one of the topics 804A-804F. A reviewing user can identify the topic 804A-804F that is not being detected or the system 100 can automatically identify the topic 804A-804F. Source strings related to the topic 804A-804F can be identified and a corresponding intent can be created. The intent classifier 122 can then be trained (using the source strings as input examples and the intent as a corresponding output example) to identify source strings associated with the new intent. The output space of the intent classifier can thus be increased in dimensionality.

To help inform whether a new intent should be detected by the intent classifier 122, analytics data regarding the source strings corresponding to a centroid can be displayed in response to a user selecting the centroid. The analytics data can include one or more of: (a) a number of source strings associated with the centroid over a specified period of time; (b) percentage of all source strings received that correspond to the topic represented by the centroid (or equivalent); (c) a timeline of a number of source strings received over a specified period of time (see FIG. 9); or the like. The centroids can be produced using a k-means clustering or other clustering technique. An input to the clustering technique can include the source string 401, the higher-dimension vector 420, the 2D vector produced at operation 308, or other encoding of the source string 401 or topic.

By viewing or interacting with the display 800 a user can determine whether a new intent should be detected by the intent classifier 122, whether an intent is no longer relevant and should be removed from the intent classifier 122, or the like. For example, a user or the virtual agent may notice that the shape 802D does not currently have a corresponding intent to be detected by the intent classifier 122. The topic of the corresponding shape 802D (e.g., a source string corresponding to a circle nearest the centroid) can regard a new product or service, a new version of the product or service, a new problem being experienced regarding the product or service, a previously unknown problem, or the like.

Figure 9:
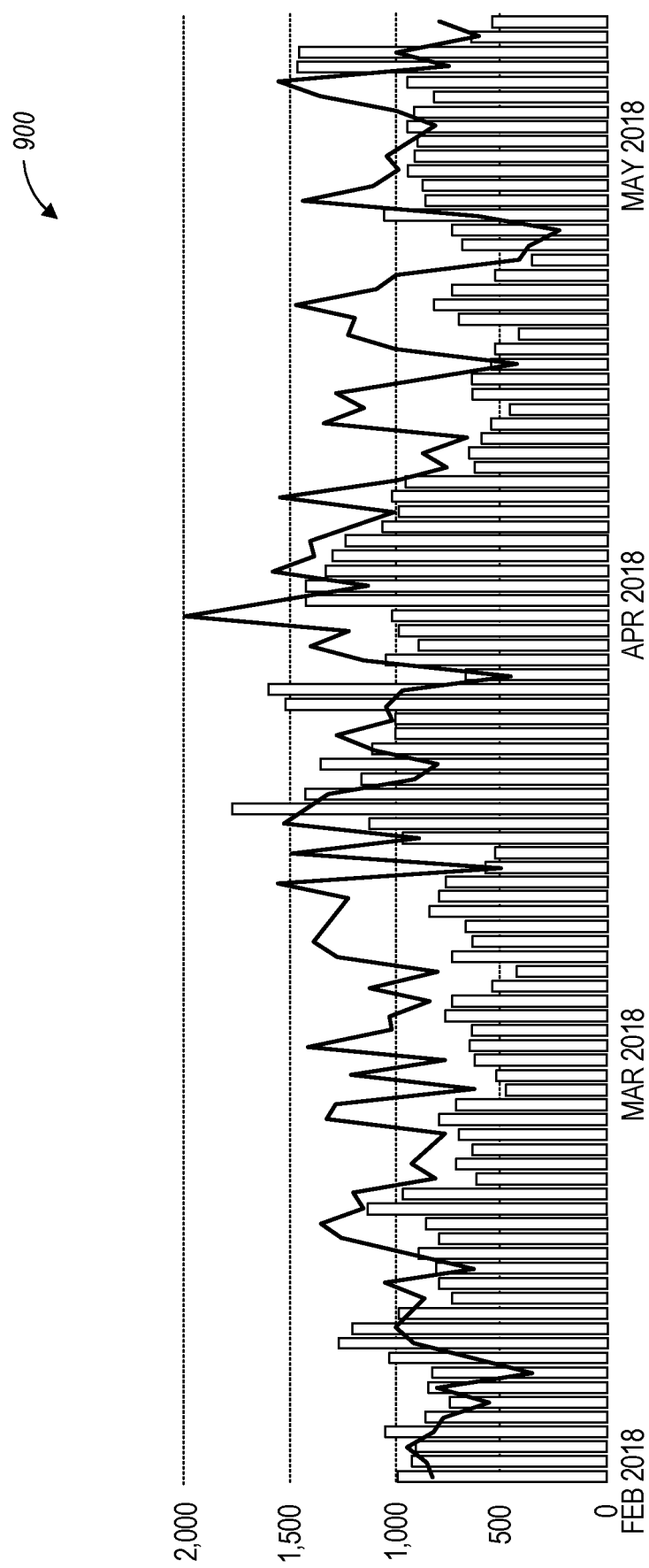
FIG. 9 illustrates, by way of example, a diagram of an embodiment of analytics data viewed as a timeline.

FIG. 9 illustrates, by way of example, a diagram of an embodiment of analytics data viewed as a timeline 900. Assume, for the sake of explanation, that the analytics correspond to the topic 804D corresponding to the shape 802D. The timeline 900 provides a user a view that can be used to determine whether the topic is newly relevant, no longer relevant, increasing in relevance, decreasing in relevance, or the like. The user can use this data to determine whether to decommission an intent from the intent classifier 122, add an intent to the intent classifier 122, or the like.

Figure 10:
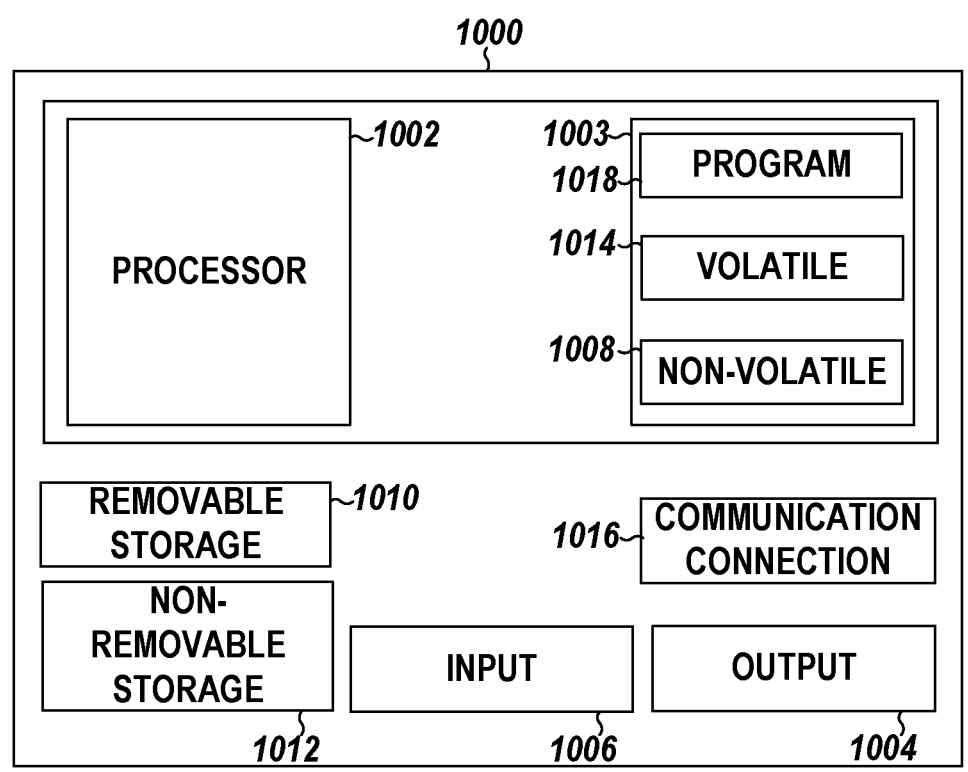
FIG. 10 illustrates, by way of example, a block diagram of an embodiment of a machine (e.g., a computer system) to implement one or more embodiments.

FIG. 10 illustrates, by way of example, a block diagram of an embodiment of a machine 1000 (e.g., a computer system) to implement one or more embodiments. One example machine 1000 (in the form of a computer), may include a processing unit 1002, memory 1003, removable storage 1010, and non-removable storage 1012. Although the example computing device is illustrated and described as machine 1000, the computing device may be in different forms in different embodiments. For example, the computing device may instead be a smartphone, a tablet, smartwatch, or other computing device including the same or similar elements as illustrated and described regarding FIG. 10. Devices such as smartphones, tablets, and smartwatches are generally collectively referred to as mobile devices. Further, although the various data storage elements are illustrated as part of the machine 1000, the storage may also or alternatively include cloud-based storage accessible via a network, such as the Internet.

Memory 1003 may include volatile memory 1014 and non-volatile memory 1008. The machine 1000 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1000 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the machine 1000, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1002 of the machine 1000. A hard drive, CD-ROM, and RAM are some examples of articles including a non-transitory computer-readable medium such as a storage device. For example, a computer program 1018 may be used to cause processing unit 1002 to perform one or more methods or algorithms described herein.

ADDITIONAL NOTES AND EXAMPLES

Example 1 includes a computing device, comprising a processor, and a memory device including instructions embodied thereon, wherein the instructions, which when executed by the processor, cause the processor to perform operations for visualization of respective intents of first users in respective interaction sessions with at least one virtual agent, the operations comprising receiving sentences from the respective interaction sessions, projecting the sentences to a higher-dimensional space to create respective higher-dimensional vectors, projecting the higher-dimensional vectors to a lower-dimensional space to create respective lower-dimensional vectors, the lower-dimensional space including either two dimensions or three dimensions, plotting the lower-dimensional vectors as respective points on a graph, encoding the respective points consistent with the respective intents determined to be associated with the sentences by an intent classifier to create encoded points, and generating a visual representation of the encoded points.

In Example 2, Example 1 further includes, wherein the visual representation includes respective sentences associated with the encoded points displayed concurrently with a graphical representation of the encoded points.

In Example 3, Example 2 further includes receiving a signal indicating a second user has selected a sentence of the respective sentences, and modifying a view of the encoded points associated with the selected sentence to indicate to which of the encoded points that the selected sentence corresponds.

In Example 4, at least one of Examples 1-3 further includes receiving a signal indicating that a second user has selected a software control of the visual representation, and responsive to the signal, generating a second visual representation with centroids of a predefined number of clusters displayed with the encoded points, each of the clusters corresponding to topics of most recently received sentences.

In Example 5, Example 4 further includes receiving a signal indicating that the second user has selected a centroid of the centroids, and generating a visual representation of analytics data corresponding to the selected centroid.

In Example 6, Example 5 further includes, wherein the visual representation of the analytics data indicates a number of times a sentence corresponding to a topic associated with the selected centroid has been received in a specified period of time.

In Example 7, at least one of Examples 4-6 further includes, responsive to receiving a signal indicating to detect an intent associated with a topic of the centroids, issuing a command that causes the intent classifier to be trained to detect the intent.

In Example 8, Example 7 further includes, wherein sentences associated with the topic are used to train the intent classifier.

In Example 9, at least one of Examples 1-8 further includes further encoding the sentences prior to projecting the sentences to the higher-dimensional space.

In Example 10, Example 9 further includes, wherein further encoding comprises producing a tri-letter gram, a character embedding, and a word embedding of the sentences, and combining the tri-letter gram, character embedding, and word embedding to generate a single vector.

In Example 11, Example 10 further includes, wherein projecting the sentences to a higher-dimensional space includes using a recurrent neural network to generate a higher-dimensional vector based on the single vector.

Example 12 includes a non-transitory machine-readable storage medium, the machine-readable storage medium including instructions that, when executed by a processor and memory of a machine, causes the machine to perform operations for visualization of a user intent in an interaction with a virtual agent, the operations comprising receiving sentences from the respective interaction sessions, projecting the sentences to a higher-dimensional space to create respective higher-dimensional vectors, projecting the higher-dimensional vectors to a lower-dimensional space to create respective lower-dimensional vectors, the lower-dimensional space including either two dimensions or three dimensions, plotting the lower-dimensional vectors as respective points on a graph, encoding the respective points consistent with the respective intents determined to be associated with the sentences by an intent classifier to create encoded points, and generating a visual representation of the encoded points.

In Example 13, Example 12 further includes, wherein the visual representation includes respective sentences associated with the encoded points displayed concurrently with a graphical representation of the encoded points.

In Example 14, Example 13 further includes receiving a signal indicating a second user has selected a sentence of the respective sentences, and modifying a view of the encoded points associated with the selected sentence to indicate to which of the encoded points that the selected sentence corresponds.

In Example 15, at least one of Examples 12-14 further includes receiving a signal indicating that a second user has selected a software control of the visual representation, and responsive to the signal, generating a second visual representation with centroids of a predefined number of clusters displayed with the encoded points, each of the clusters corresponding to topics of most recently received sentences.

In Example 16, Example 15 further includes receiving a signal indicating that the second user has selected a centroid of the centroids, and generating a visual representation of analytics data corresponding to the selected centroid.

In Example 17, at least one of Examples 12-16 further includes, wherein the visual representation of the analytics data indicates a number of times a sentence corresponding to a topic associated with the selected centroid has been received in a specified period of time.

In Example 18, at least one of Examples 12-17 further includes, wherein the operations further comprise responsive to receiving a signal indicating to detect an intent associated with a topic of the centroids, issuing a command that causes the intent classifier to be trained to detect the intent.

In Example 19, at least one of Examples 12-18 further includes, wherein sentences associated with the topic are used to train the intent classifier.

In Example 20, at least one of Examples 12-19 further includes, wherein the operations further comprise further encoding the sentences prior to projecting the sentences to the higher-dimensional space.

In Example 21, Example 20 further includes, wherein further encoding comprises producing a tri-letter gram, a character embedding, and a word embedding of the sentences, and combining the tri-letter gram, character embedding, and word embedding to generate a single vector.

In Example 22, Example 21 further includes, wherein projecting the sentences to a higher-dimensional space includes using a recurrent neural network to generate a higher-dimensional vector based on the single vector.

Example 23 includes a method for visualization of a user intent in an interaction with a virtual agent, the method comprising a plurality of operations executed with a processor and memory of a computing device, the plurality of operations comprising receiving sentences from the respective interaction sessions, projecting the sentences to a higher-dimensional space to create respective higher-dimensional vectors, projecting the higher-dimensional vectors to a lower-dimensional space to create respective lower-dimensional vectors, the lower-dimensional space including either two dimensions or three dimensions, plotting the lower-dimensional vectors as respective points on a graph, encoding the respective points consistent with the respective intents determined to be associated with the sentences by an intent classifier to create encoded points, and generating a visual representation of the encoded points.

In Example 24, Example 23 further include, wherein the operations further comprise further encoding the sentences prior to projecting the sentences to the higher-dimensional space.

In Example 25, Example 24 further includes, wherein further encoding comprises producing a tri-letter gram, a character embedding, and a word embedding of the sentences, and combining the tri-letter gram, character embedding, and word embedding to generate a single vector.

In Example 26, Example 25 further includes, wherein projecting the sentences to a higher-dimensional space includes using a recurrent neural network to generate a higher-dimensional vector based on the single vector.

In Example 27, at least one of Examples 23-26 further includes, wherein the visual representation includes respective sentences associated with the encoded points displayed concurrently with a graphical representation of the encoded points.

In Example 28, Example 27 further includes receiving a signal indicating a second user has selected a sentence of the respective sentences, and modifying a view of the encoded points associated with the selected sentence to indicate to which of the encoded points that the selected sentence corresponds.

In Example 29, at least one of Examples 23-28 further includes receiving a signal indicating that a second user has selected a software control of the visual representation, and responsive to the signal, generating a second visual representation with centroids of a predefined number of clusters displayed with the encoded points, each of the clusters corresponding to topics of most recently received sentences.

In Example 30, Example 29 further includes, wherein the operations further comprise receiving a signal indicating that the second user has selected a centroid of the centroids, and generating a visual representation of analytics data corresponding to the selected centroid.

In Example 31, Example 30 further includes, wherein the visual representation of the analytics data indicates a number of times a sentence corresponding to a topic associated with the selected centroid has been received in a specified period of time.

In Example 32, at least one of Examples 23-31 further includes, wherein the operations further comprise responsive to receiving a signal indicating to detect an intent associated with a topic of the centroids, issuing a command that causes the intent classifier to be trained to detect the intent.

In Example 33, at least one of Examples 23-32 further includes, wherein sentences associated with the topic are used to train the intent classifier.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computing device, comprising:
   a processor; and
   a memory device including instructions embodied thereon, wherein the instructions, which when executed by the processor, cause the processor to perform operations for visualization of respective intents of first users in respective interaction sessions with at least one virtual agent, the operations comprising:
   receiving sentences from the respective interaction sessions;
   projecting the sentences to a higher-dimensional space to create respective higher-dimensional vectors;
   projecting the higher-dimensional vectors to a lower-dimensional space to create respective lower-dimensional vectors, the lower-dimensional space including either two dimensions or three dimensions;
   plotting the lower-dimensional vectors as respective points on a graph;
   encoding the respective points consistent with the respective intents determined to be associated with the sentences by an intent classifier to create encoded points; and
   generating a visual representation of the encoded points.

2. The computing device of claim 1, wherein the visual representation includes respective sentences associated with the encoded points displayed concurrently with a graphical representation of the encoded points.

3. The computing device of claim 2, further comprising:
   receiving a signal indicating a second user has selected a sentence of the respective sentences; and
   modifying a view of the encoded points associated with the selected sentence to indicate to which of the encoded points that the selected sentence corresponds.

4. The computing device of claim 1, further comprising:
   receiving a signal indicating that a second user has selected a software control of the visual representation; and
   responsive to the signal, generating a second visual representation with centroids of a predefined number of clusters displayed with the encoded points, each of the clusters corresponding to topics of most recently received sentences.

5. The computing device of claim 4, further comprising:
   receiving a signal indicating that the second user has selected a centroid of the centroids; and
   generating a visual representation of analytics data corresponding to the selected centroid.

6. The computing device of claim 5, wherein the visual representation of the analytics data indicates a number of times a sentence corresponding to a topic associated with the selected centroid has been received in a specified period of time.

7. The computing device of claim 4, further comprising:
   responsive to receiving a signal indicating to detect an intent associated with a topic of the centroids, issuing a command that causes the intent classifier to be trained to detect the intent.

8. The computing device of claim 7, wherein sentences associated with the topic are used to train the intent classifier.

9. The computing device of claim 1, further comprising:
   further encoding the sentences prior to projecting the sentences to the higher-dimensional space.

10. The computing device of claim 9, wherein further encoding comprises:
    producing a tri-letter gram, a character embedding, and a word embedding of the sentences; and
    combining the tri-letter gram, character embedding, and word embedding to generate a single vector.

11. The computing device of claim 10, wherein projecting the sentences to a higher-dimensional space includes using a recurrent neural network to generate a higher-dimensional vector based on the single vector.

12. A non-transitory machine-readable storage medium, the machine-readable storage medium including instructions that, when executed by a processor and memory of a machine, causes the machine to perform operations for visualization of a user intent in an interaction with a virtual agent, the operations comprising:
    receiving sentences from the respective interaction sessions;
    projecting the sentences to a higher-dimensional space to create respective higher-dimensional vectors;
    projecting the higher-dimensional vectors to a lower-dimensional space to create respective lower-dimensional vectors, the lower-dimensional space including either two dimensions or three dimensions;
    plotting the lower-dimensional vectors as respective points on a graph;
    encoding the respective points consistent with the respective intents determined to be associated with the sentences by an intent classifier to create encoded points; and
    generating a visual representation of the encoded points.

13. The non-transitory machine-readable storage medium of claim 12, wherein the visual representation includes respective sentences associated with the encoded points displayed concurrently with a graphical representation of the encoded points.

14. The non-transitory machine-readable storage medium of claim 13, wherein the operations further comprise:
    receiving a signal indicating a second user has selected a sentence of the respective sentences; and
    modifying a view of the encoded points associated with the selected sentence to indicate to which of the encoded points that the selected sentence corresponds.

15. The non-transitory machine-readable storage medium of claim 12, wherein the operations further comprise:

receiving a signal indicating that a second user has selected a software control of the visual representation; and responsive to the signal, generating a second visual representation with centroids of a predefined number of clusters displayed with the encoded points, each of the clusters corresponding to topics of most recently received sentences.

16. The non-transitory machine-readable storage medium of claim 15, wherein the operations further comprise:

receiving a signal indicating that the second user has selected a centroid of the centroids; and generating a visual representation of analytics data corresponding to the selected centroid.

17. A method for visualization of a user intent in an interaction with a virtual agent, the method comprising a plurality of operations executed with a processor and memory of a computing device, the plurality of operations comprising:

receiving sentences from the respective interaction sessions;

projecting the sentences to a higher-dimensional space to create respective higher-dimensional vectors;

projecting the higher-dimensional vectors to a lower-dimensional space to create respective lower-dimensional vectors, the lower-dimensional space including either two dimensions or three dimensions;

plotting the lower-dimensional vectors as respective points on a graph;

encoding the respective points consistent with the respective intents determined to be associated with the sentences by an intent classifier to create encoded points; and generating a visual representation of the encoded points.

18. The method of claim 17, wherein the operations further comprise further encoding the sentences prior to projecting the sentences to the higher-dimensional space.

19. The method of claim 18, wherein further encoding comprises producing a tri-letter gram, a character embedding, and a word embedding of the sentences, and combining the tri-letter gram, character embedding, and word embedding to generate a single vector.

20. The method of claim 19, wherein projecting the sentences to a higher-dimensional space includes using a recurrent neural network to generate a higher-dimensional vector based on the single vector.

* * * * *